United States Patent [19]

Rodgers

[11] Patent Number: 4,885,909
[45] Date of Patent: Dec. 12, 1989

[54] METHOD OF OPERATING A MULTIPURPOSE AUXILIARY POWER UNIT

[75] Inventor: Colin Rodgers, San Diego, Calif.

[73] Assignee: Sundstrand Corporation, Rockford, Ill.

[21] Appl. No.: 271,516

[22] Filed: Nov. 14, 1988

Related U.S. Application Data

[62] Division of Ser. No. 92,408, Sep. 2, 1987, abandoned.

[51] Int. Cl.[4] .............................................. F02C 7/268
[52] U.S. Cl. ................................... 60/39.02; 60/39.07; 60/39.142
[58] Field of Search ............... 60/39.02, 39.07, 39.141, 60/39.142, 39.15, 727

[56] References Cited

U.S. PATENT DOCUMENTS

| | | | |
|---|---|---|---|
| 3,965,673 | 6/1976 | Friedrich | 60/39.15 |
| 4,092,824 | 6/1978 | Friedrich | 60/39.142 |
| 4,494,372 | 1/1985 | Cronin | 60/39.07 |
| 4,684,081 | 8/1987 | Cronin | 60/39.141 |
| 4,686,822 | 8/1987 | Frutschi | 60/39.02 |
| 4,815,277 | 3/1989 | Vershure et al. | 60/39.142 |

Primary Examiner—Louis J. Casaregola
Attorney, Agent, or Firm—Wood, Dalton, Phillips Mason & Rowe

[57] ABSTRACT

A single gas turbine may be made alternately useable as an auxiliary power unit, a load compressor, an air turbine starter, or an air turbine starter motor by placing a selectively operable clutch 38 between a centrifugal compressor 10 and a turbine wheel 30, by placing a valve 58 in ducting 48, 50, 52, 54 extending from the compressor 10 to a combustor 44, and by providing variable inlet vanes 24 at the inlet 20 to the compressor 10. By appropriate operation of the valve 58, the clutch 38, and the vanes 24, each of the foregoing functions can be obtained.

2 Claims, 1 Drawing Sheet

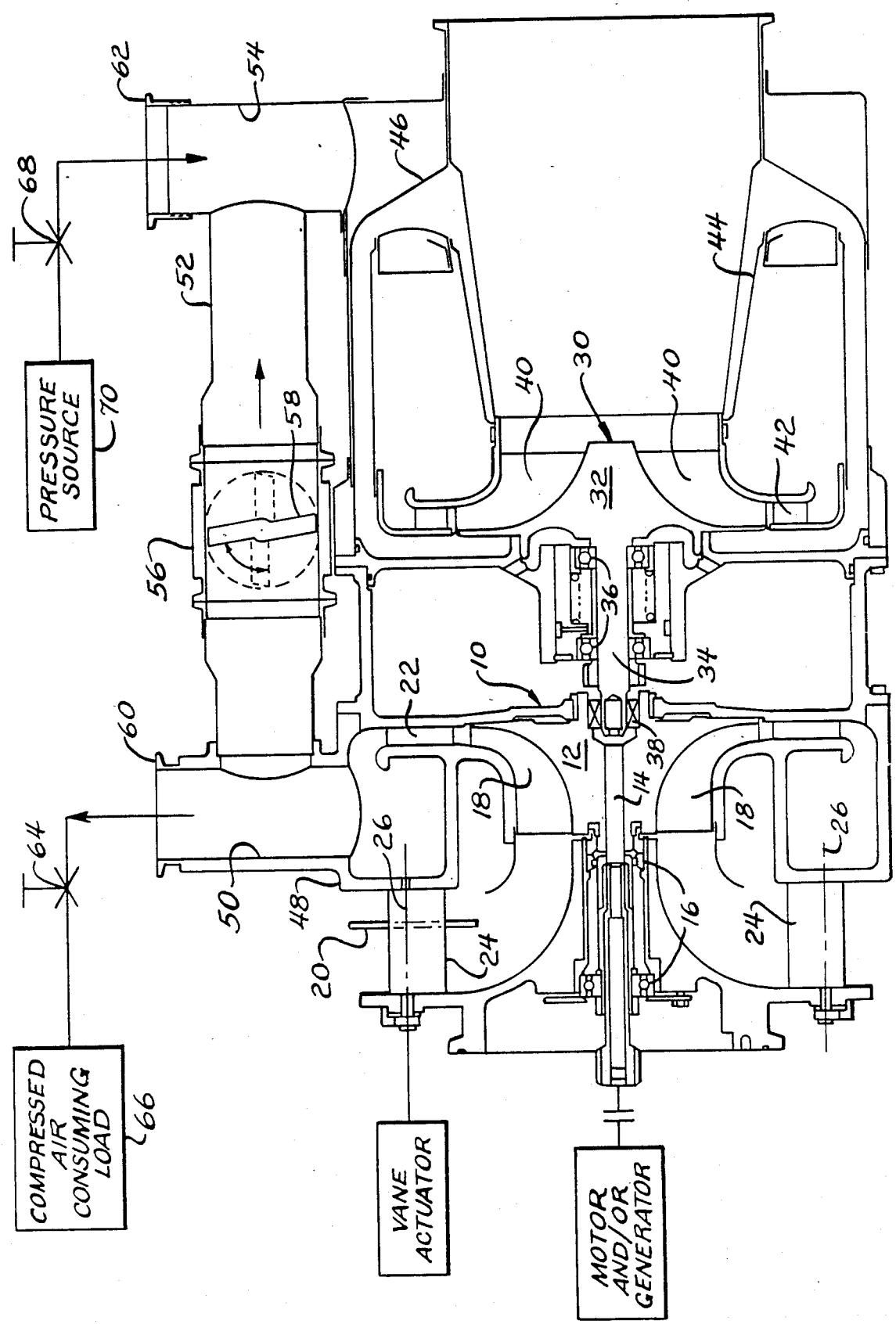

METHOD OF OPERATING A MULTIPURPOSE AUXILIARY POWER UNIT

This is a division of application Ser. No. 092,408 filed Sept. 2, 1987 (abandoned).

FIELD OF THE INVENTION

This invention relates to gas turbines, and more particularly, to a gas turbine that may be alternately used as an auxiliary power unit, a load compressor, an air turbine starter, or an air turbine starter motor.

BACKGROUND OF THE INVENTION

Many aircraft in use today require the presence of an auxiliary power unit at one stage or another during their operation. Generally speaking, the function of the auxiliary power unit is to provide electrical and/or hydraulic power to aircraft systems when the aircraft's main engines are not in operation.

Additionally, in aircraft operating environments, it is also desirable in many instances to have a source of compressed air that may be utilized, for example, in starting the aircraft's main propulsion engines or in providing compressed air to aircraft systems that ordinarily would receive compressed air as bleed air from their main propulsion engines.

Further, not infrequently, such environments also require an air turbine starter for initiating operation of a turbine and/or an air turbine starter motor which is much the same as an air turbine starter but is adapted to be operated more or less continuously.

Needless to say, to provide all the equipment necessary to perform the foregoing functions is quite expensive, and where such equipment is on board the aircraft, it lessens the load carrying capability of the aircraft, all other things being equal, because of the weight of such equipment.

The present invention is directed to overcoming one or more of the above problems.

SUMMARY OF THE INVENTION

It is the principal object of the invention to provide a new and improved gas turbine system. More specifically, it is an object of the invention to provide a gas turbine system which is alternately useable as an auxiliary power unit, a load compressor, an air turbine starter, and/or an air turbine starter motor so as to minimize the cost and weight of the equipment required to perform such functions.

An exemplary embodiment of the invention achieves the foregoing objects in a structure including a centrifugal compressor mounted for rotation along with a turbine wheel. A clutch interconnects the compressor and the turbine wheel and is selectively operable to couple or decouple the two. The compressor includes an inlet and variable inlet guide vanes are disposed in the inlet and are movable between positions substantially opening and substantially closing the inlet. The compressor also includes a compressed air outlet and a gas inlet is provided. A combustor interconnects the gas inlet and the turbine wheel and there is further provided ducting which interconnects the compressed air outlet and the gas inlet. The ducting includes valve means movable between a first position halting flow from the compressed air outlet to the gas inlet and a second position allowing such flow. There is further provided a first port in the ducting between the compressed air outlet and the valve means which is openable to direct compressed air to an external point of use and a second port in the ducting between the valve means and the gas inlet which is openable to admit pressurized air from an external source.

As a consequence of this construction, the gas turbine can be operated as a load compressor by decoupling the turbine from the compressor and driving the compressor by the main propulsion engines or a rotary machine such as a motor or the like. By directing compressor air to the combustor, and driving a rotary machine such as a generator or a pump by the compressor or the turbine wheel, the turbine can be used as an auxiliary power unit. By coupling the compressor and the turbine wheel via the clutch and closing the variable inlet guide vanes and with the valve means operated to isolate the compressor from the combustor, the apparatus may receive pressurized gas from an external source and be used as an air turbine starter or an air turbine starter motor.

The invention also contemplates the method of operating such a gas turbine alternatively as a load compressor, an auxiliary power unit, an air turbine starter, and/or an air turbine starter motor employing the steps generally stated immediately preceding.

Other objects and advantages will become apparent from the following specification taken in connection with the accompanying drawings.

DESCRIPTION OF THE DRAWINGS

The FIGURE is a sectional view of a gas turbine engine made according to the invention with certain related system components shown schematically.

DESCRIPTION OF THE PREFERRED EMBODIMENT

An exemplary embodiment of a gas turbine made according to the invention is illustrated in the FIGURE and is seen to include a centrifugal compressor, generally designated 10. The compressor 10 includes a hub 12 on a shaft 14 which in turn is journaled by bearings 16. A plurality of vanes 18 are carried by the hub 12 and act, in a conventional fashion, to compress air received from an air inlet 20 and deliver the same radially outward to a diffuser 22 of conventional construction.

The inlet 20 is provided with guide vanes 24 and the same are pivotally mounted for rotation about axes 26. An actuating system 28 is utilized selectively as desired to rotate the vanes 24 within the inlet 10 to regulate air flow to the blades 18. In addition, the vanes 24 are movable to a position wherein the inlet 20 is closed off from the compressor 10.

The turbine also includes a turbine wheel, generally designated 30 which includes a hub 32 and a shaft 34 for journaling the turbine wheel 30 in bearings 36. The shaft 34 extends toward the hub 12 and is connected thereto by a selectively operable clutch 38 of conventional construction which may be used to couple or decouple the compressor 10 and the turbine wheel 30 from one another.

The turbine wheel 30, and specifically the hub 32 thereof, carries a plurality of turbine blades 40. An annular nozzle structure 42 is adapted to direct gas under pressure toward the blades 40 to drive the turbine wheel 30 as is well known and pressurized gas is applied to the nozzle 42 from an annular combustor 44 wherein fuel may be burned with compressed air typically supplied by the compressor 10 to generate the necessary gas to drive the turbine wheel 30.

The combustor 44 includes a gas inlet 46 from which it may receive combustion supporting gas under pressure.

Duct work including an annular manifold 48 in fluid communication with the radially outer side of the diffuser 22, a conduit 50, a conduit 52, and a conduit 54 interconnect the diffuser 22, which serves as the compressor outlet, with the gas inlet 46.

The conduit 52, intermediate its ends, includes a butterfly valve 56 including a valve disc 58 movable between the solid and dotted line positions illustrated in the FIGURE. In the solid line position, flow from the compressor outlet or diffuser 22 to the gas inlet 46 is precluded. Conversely, when the valve disc 58 is moved to the dotted line position, flow from the diffuser 22 to the inlet 46 is permitted.

The conduit 50 is provided with a port 60 whereas the conduit 54 is provided with a port 62. The port 60, in the usual case, will be connected via a valve 64 to a compressed air consuming load 66. The load 66 may be any type of device or system requiring compressed air. For example, the same may be an aircraft air conditioning system which normally would be operated on bleed air from an aircraft engine. Alternatively, the load could be an air starter motor for a gas turbine engine. Other examples of possible loads will be readily apparent to those skilled in the art.

The port 62 is connected via a selectively operable valve 68 to an external source of gas, usually air under pressure, shown schematically at 70.

The overall system is typically completed by coupling one or the other of the compressor 10 and the turbine wheel 30 to a rotary machine 72. In the preferred embodiment, this is accomplished by coupling the compressor shaft 14 via a clutch 74 to a dynamoelectric machine such as a motor, a generator, or a motor/generator, or a hydraulic pump.

Operation of the gas turbine is as follows. To utilize the same as a conventional auxiliary power unit or APU, the vane actuator 28 is set to move the vanes 24 to a position opening the inlet 20. The shafts 14 and 34 are coupled together by engaging the clutch 38. The valve 58 is moved to its dotted line position as shown in the drawing and the valve 68 will be closed. The valve 64 will typically be closed or only partially open if bleed air from the compressor 10 is required as part of the operation of the unit as an APU.

In this configuration, compressed air from the compressor 10 will be delivered to the combustor 44 via the manifold 48, the conduits 50, 52 an 54 and the inlet 46 The gasses of combustion generated in the combustor 44 will drive the turbine wheel 30 which in turn will drive the compressor 10 to continue the supply of compressed air. Power from the unit may be taken out as bleed air via the valve 64 as mentioned previously or, more likely, from the rotary machine 72 coupled to the shaft 14 either as electrical energy or hydraulic fluid under pressure.

To use the apparatus as a load compressor, the valve 58 is moved to the solid line position to isolate the compressor 10 from the turbine 30. The clutch 38 is disengaged to allow the compressor 10 to be rotated independently of the turbine wheel 30 and the shaft 14 driven by the rotary machine 72. The inlet guide vanes 24 will be in an open position and compressed air will be delivered to the port 60 and to a compressed air consuming load 66 via the valve 64 from the compressor 10.

To use the apparatus as an air turbine starter as, for example, in starting the unit itself, the vane actuator 28 is operated to cause the inlet guide vanes 24 to move to their closed position and the valve disc 58 moved to its solid line position as illustrated in the drawing. Pressurized gas, usually air, will be directed to the port 62 from the pressure source 70 via the valve 68 to enter the combustor 44 through the gas inlets 46 and be directed by the nozzle 42 against the turbine wheel blades 40. This will accelerate the turbine wheel 30 along with the compressor 10 and allow the gas turbine to be accelerated after which the inlet guide vanes 24 will be moved to an open position along with the valve disc 58 to provide combustion sustaining air to the combustor.

Alternatively, where the apparatus is to be utilized as an air turbine starter motor, the turbine wheel 30 is brought up to a constant speed by pressurized gas from the source 70 as mentioned immediately preceding and because the turbine wheel 30 is coupled to the compressor 10 by the clutch 28, the rotary machine 72 may be driven thereby.

It is to be specifically noted that in use of the machine as an air turbine starter or as an air turbine starter motor, the closing of the inlet guide vanes 24 during parts or all of those sequences eliminates the loading that would otherwise be present on the rotary components of the machine because the compressor vanes 18 will not be acting to compress air.

From the foregoing, it will be appreciated that a gas turbine made according to the invention is readily useable to perform many functions heretofore requiring individual and independently operable pieces of equipment. As a consequence, the expense of providing equipment to perform the function can be minimized as can the weight of such equipment thereby making it ideally suitable for use in aircraft environments.

I claim:

1. A method of operating a gas turbine alternatively as an auxiliary power unit, a load compressor, and air turbine starter or the like, the turbine including a centrifugal compressor and a rotary turbine wheel together with a clutch interconnecting the compressor and the turbine wheel and selectively operable to couple or decouple the compressor, variable inlet guide vanes for the compressor, and a combustor for providing hot gas to the turbine, said method comprising the steps of:
   (a) operating the gas turbine as an auxiliary power unit by driving the compressor by the turbine wheel while coupling a rotary machine to be driven to one of the compressor and the turbine wheel;
   (b) operating the gas turbine as a load compressor by driving the compressor with the same decoupled from the turbine wheel by the clutch and diverting air compressed by the compressor from the combustor to an external load consuming compressed air; and
   (c) operating the turbine wheel as an air turbine starter for the gas turbine by directing compressed gas from an external source to the combustor while initially closing the inlet guide vanes to the compressor and coupling the compressor to the turbine wheel by the clutch, and thereafter opening said inlet guide vanes.

2. A method according to claim 1 including additionally utilizing the gas turbine alternatively as an air turbine starter motor for a rotary machine wherein the rotary machine to be started is coupled to said compressor and step (c) is performed until the turbine wheel is brought up to a desired speed.

* * * * *